US010059329B2

(12) United States Patent
Petz et al.

(10) Patent No.: US 10,059,329 B2
(45) Date of Patent: Aug. 28, 2018

(54) METHOD FOR OPERATING AN ELECTRIC OR HYBRID VEHICLE WITH SHIFTABLE TRANSMISSION AND ELECTRIC OR HYBRID VEHICLE

(71) Applicant: AUDI AG, Ingolstadt (DE)

(72) Inventors: Andreas Petz, Vohburg (DE); Sebastian Heber, Freiberg (DE); Benjamin Knoeferl, Boehmfeld (DE); Arne Herrmann, Munich (DE); Gerald Rieder, Freising (DE); Roman Strasser, Gaimersheim (DE)

(73) Assignee: AUDI CHINA, Beijing (CN)

( * ) Notice: Subject to any disclaimer, the term of this patent is extended or adjusted under 35 U.S.C. 154(b) by 103 days.

(21) Appl. No.: 15/104,263

(22) PCT Filed: Jan. 15, 2014

(86) PCT No.: PCT/IB2014/058278
§ 371 (c)(1),
(2) Date: Jun. 14, 2016

(87) PCT Pub. No.: WO2015/107387
PCT Pub. Date: Jul. 23, 2015

(65) Prior Publication Data
US 2016/0311427 A1 Oct. 27, 2016

(51) Int. Cl.
*B60W 20/30* (2016.01)
*B60K 6/48* (2007.10)
(Continued)

(52) U.S. Cl.
CPC .............. *B60W 20/30* (2013.01); *B60K 6/48* (2013.01); *B60K 6/547* (2013.01); *B60W 20/00* (2013.01);
(Continued)

(58) Field of Classification Search
CPC . Y10T 477/26; Y10T 477/328; Y10T 477/33; B60W 20/30; B60W 2510/085;
(Continued)

(56) References Cited

U.S. PATENT DOCUMENTS 5,720,690 A * 2/1998 Hara ................. B60K 6/48
180/65.25
8,414,449 B2 * 4/2013 Heap ................. B60K 6/365
180/65.265
(Continued)

FOREIGN PATENT DOCUMENTS

DE 443 89 914 A1 5/1996
WO PCT/IB2014/058278 1/2014

OTHER PUBLICATIONS

International Search Report for PCT/IB/2014/058278 dated Sep. 10, 2014.
(Continued)

*Primary Examiner* — Roger L Pang
(74) *Attorney, Agent, or Firm* — Staas & Halsey LLP

(57) ABSTRACT

At least one electric motor is employed for propelling an electric or hybrid vehicle with a shiftable transmission. Upon reaching a shift threshold, a shift operation is performed in the transmission of the vehicle, wherein a value specifying the shift threshold is varied depending on at least one parameter. As the at least one parameter, a speed is used, at which a power provided by the at least one electric motor for propelling the vehicle has a maximum.

9 Claims, 3 Drawing Sheets

(51) Int. Cl.

| | |
|---|---|
| *B60W 20/00* | (2016.01) |
| *F16H 61/02* | (2006.01) |
| *B60K 6/547* | (2007.10) |
| *F16H 59/48* | (2006.01) |
| *F16H 59/72* | (2006.01) |
| *F16H 59/78* | (2006.01) |
| *B60W 10/08* | (2006.01) |
| *F16H 59/14* | (2006.01) |
| *F16H 59/36* | (2006.01) |
| *B60W 10/10* | (2012.01) |
| *F16H 61/00* | (2006.01) |

(52) U.S. Cl.
CPC ............ *F16H 59/48* (2013.01); *F16H 59/72* (2013.01); *F16H 59/78* (2013.01); *F16H 61/0213* (2013.01); *B60K 2006/4825* (2013.01); *B60W 10/08* (2013.01); *B60W 10/10* (2013.01); *B60W 2510/085* (2013.01); *B60W 2510/244* (2013.01); *B60W 2510/246* (2013.01); *B60Y 2200/92* (2013.01); *B60Y 2300/70* (2013.01); *F16H 2059/145* (2013.01); *F16H 2059/363* (2013.01); *F16H 2061/0096* (2013.01); *Y02T 10/6221* (2013.01); *Y02T 10/6252* (2013.01); *Y10S 903/919* (2013.01); *Y10S 903/945* (2013.01); *Y10T 477/26* (2015.01); *Y10T 477/328* (2015.01); *Y10T 477/33* (2015.01)

(58) Field of Classification Search
CPC .......... B60W 2510/244; B60W 10/10; B60W 2510/246; B60W 10/08; F16H 59/72; F16H 59/78; F16H 2059/145; F16H 2059/363; F16H 2061/0096; Y10S 903/919; Y10S 903/945
See application file for complete search history.

(56) References Cited

U.S. PATENT DOCUMENTS

| | | | |
|---|---|---|---|
| 8,528,676 B2* | 9/2013 | Endo | B60K 6/445 |
| | | | 180/65.285 |
| 2010/0168946 A1 | 7/2010 | Snyder | |
| 2014/0066250 A1* | 3/2014 | Schulte | B60K 6/387 |
| | | | 477/4 |
| 2015/0031503 A1* | 1/2015 | Isomura | B60W 10/113 |
| | | | 477/5 |
| 2015/0198239 A1* | 7/2015 | Wilbur, Jr. | F16H 61/0213 |
| | | | 701/55 |
| 2015/0283996 A1* | 10/2015 | Wang | B60K 6/547 |
| | | | 477/3 |
| 2017/0197609 A1* | 7/2017 | Colvin | B60W 10/08 |
| 2017/0197614 A1* | 7/2017 | Burt | B60W 20/40 |

OTHER PUBLICATIONS

XOMAX XM-RSU212AC-B Autoradio mit App Steuerung fur: Amazond.de. Elektronik; www.amazon.de/XOMAZ-XM-RSU212AC-B-B-Freisprecheinrichtung-Musikwiedergabe-Beleuchtung/dp/B00DOSFSVQ; Jul. 23, 2014; pp. 1-2.
Mercedis-Benz Deutschland-Komfort & Sicherheit—Innenraumkomfort—Oase der Ruhe and Entsannung; www.mercedes-benz.de/content/germany/mpc/mpc_germany_website/de/home_mpc/passengercars/home/ new_cars/models/s-class/w222/facts_/comfort; Jul. 23, 2014; pp. 1-2.
Rocky Dancing Colours; Infomrationen über ROCKY; de.appszoom.com/android-app/rocky-dancing-colours-kglfs.html; 5 pp.

* cited by examiner

METHOD FOR OPERATING AN ELECTRIC OR HYBRID VEHICLE WITH SHIFTABLE TRANSMISSION AND ELECTRIC OR HYBRID VEHICLE

CROSS REFERENCE TO RELATED APPLICATIONS

This application is the U.S. national stage of International Application No. PCT/IB2014/058278, filed Jan. 15, 2014 and claims the benefit thereof and is incorporated by reference herein in its entirety.

BACKGROUND

Described below is a method for operating an electric or hybrid vehicle with shiftable transmission, in which at least one electric motor is employed for propelling the vehicle. Upon reaching a shift threshold, a shift operation is performed in the transmission of the vehicle. Herein, a value specifying the shift threshold is varied depending on at least one parameter. Also described below is a vehicle with at least one electric motor formed for propelling the vehicle.

DE 44 38 914 A1 describes an electric vehicle having an electric motor for propelling the vehicle as well as a transmission controller for controlling a gear change of an automatically shiftable transmission. For shifting optimum in terms of consumption, three different methods of a gear selection function are provided. In a first method, shift lines optimum in terms of consumption are stored in the transmission controller. These optimum shift lines consider losses in the partial systems of battery, power actuator, electric motor, transmission and auxiliary load. In the second variant, temporally non-constant influencing parameters on the losses are considered by adaptation of the optimum shift lines. Variables considered in adaptation of the shift lines optimum in terms of consumption include the transmission temperature, the temperature of the electric motor, the state of charge, the open-circuit voltage and the internal resistance of the battery. In order to consider these influences, calculations are performed. Correction factors are introduced into corresponding equations for the parameter adaptation.

Such an adaptation with correction factors for considering a larger number of influencing parameters is comparatively expensive.

Furthermore, in today's power trains of electric vehicles and hybrid vehicles with automatic transmission, the gear selection is effected according to shift maps. The input parameters of such shift maps include the driver's wish, thus the accelerator position, and the currently applied speed among other things. Upon full-load acceleration with the electric vehicle or hybrid vehicle, a shift operation occurs upon reaching a shift threshold, for instance a shift speed stored in the shift map. After performing the shift operation, a new subsequent speed appears in the power train. It results from the respective gear ratio variation. Usually, the static shift speed is set such that upon full-load acceleration that speed of the electric motor is reached, at which the nominal maximum power of the electric motor is achieved.

SUMMARY

Described herein are a method and a vehicle of the initially mentioned kind, by which the power potential of the electric motor can be utilized in particularly simple manner.

In the method, a speed is used as the at least one parameter, at which a power provided by the at least one electric motor for propelling the vehicle has a maximum. This speed can also be referred to as kink speed since the torque provided by the electric motor and also the provided power decrease more or less abruptly upon exceeding this speed.

The speed, at which the electric motor is actually capable of delivering the currently available maximum power, is influenced by a set of variables. By varying the value specifying the shift threshold depending solely on the kink speed, these variables can be taken into account. These variables being reflected in the currently present kink speed and thus influencing the position of the power maximum of the electric motor thereby also have an influence on the position of the shift threshold. Correspondingly, the value specifying the shift threshold is varied depending on the kink speed.

Upon determination of the kink speed, a corresponding signal can be communicated to a control device. The control device can utilize this information for adapting a shift speed and thus take into account the currently available maximum power of the at least one electric motor.

This is based on the realization that with a static value specifying the shift threshold, the power maximum of the electric motor may be outside of the actually driven speed range due to the influence of variables influencing the properties of the electric drive propulsion. However, then, the potentially available mechanical propulsion power of the electric drive propulsion is not optimally exploited. Correspondingly, such a static shift map does not consider the speed variance of the power maximum of the electric drive propulsion. However, presently, the power potential and the efficiency potential of the power train is utilized for best possible propulsion in the electric drive operation or in the electric and internal combustion engine drive operation by considering the varying position of the power maximally provided by the electric motor in the speed range.

In addition, only the parameter of the kink speed is used to vary the value specifying the shift threshold or the shift speed. Thus, shift characteristics are displaced depending on the kink speed. The determination of shift characteristics optimum with regard to power can be particularly fast effected since only one parameter, namely that of the kink speed, has to be considered. Thus, the available mechanical propulsion power or the efficiency of the electric drive propulsion can be exploited very simply and always in optimum manner. Correspondingly, the power potential of the electric motor is exploited in particularly simple manner.

In addition, conclusions to the efficiency of the power train can be drawn from the kink speed, which influence the shift thresholds.

The shift operation may be performed if an acceleration of the vehicle is requested by a driver of the same under full load of the at least one electric motor. The acceleration may also be requested by a control system such as an electronic control unit of the vehicle. Upon acceleration under full load, demand for the power maximally provided by the electric motor is particularly advantageous. Namely, thus, in the purely electric or in the hybrid drive operation, maximum acceleration can be achieved.

If the driver requests acceleration under full load by operating the accelerator, thus, this entails a comparatively great load for the electric motor and components associated with the electric motor, which could result in damage in continuous operation. Correspondingly, for component part protection, in particular for protection against the occurrence of too great heat on the electric motor and/or these components, it can be advantageous to limit the maximum power provided by the electric motor. The components associated with the electric motor can include power electronics, a battery or like electric energy storage or another electric power source supplying the electric motor and/or lines. However, in continuous operating mode of the electric motor, in which the maximum power provided is limited, the power maximum of the electric motor can shift towards different speeds, than in an unlimited operating mode. In particular the power maximum of the electric motor can shift towards higher speeds in the in continuous operating mode.

Therefore, it has appeared advantageous to change and in particular to increase the value specifying the shift threshold if the at least one electric motor is operated in the continuous operating mode. In this continuous operating mode, operational damage to the electric motor and/or to the component associated with the electric motor is avoided. Thus, even with presence of the continuous operating mode serving for component part protection, the then valid power maximum of the electric motor can be exploited, since it is in the available speed range. However, impairment or undesirably severe heating of the mentioned component parts or components is avoided.

A data value specifying the speed can be computed, for instance by a control device which evaluates at least one variable influencing the speed. In terms of control however, it is particularly simple if a data value specifying the speed is taken from a map. Namely, the speed, at which the electric motor provides its maximum power for propelling the vehicle, can thus be particularly fast provided such that particularly fast data processing is achieved.

Herein, it has appeared advantageous if at least one variable is considered by using the computed data value or the map, which is associated with an electric energy storage or with another electric power source of the vehicle and which influences the speed, at which the power provided by the electric motor for propelling the vehicle has the maximum.

This is based on the realization that in particular variables associated with an electric energy storage such as a battery and/or with another electric power source such as a fuel cell or a range extender have an influence on the kink speed. As the power output of such devices can vary depending on a number of factors the kink speed varies accordingly. For example a range extender may be utilized to provide electric energy to the electric motor once the output of a battery has diminished. If due to this the maximum power available to the electric motor is reduced, this can be reflected in a reduced kink speed.

These variables can include the voltage of the battery and/or the voltage of the battery under load and/or a state of charge and/or a state of health of the battery and/or a temperature thereof. Namely, decrease of the battery load voltage due to discharge and decrease of the state of charge for example result in shift of the power maximum of the electric motor towards lower speeds. Correspondingly, a lower kink speed is present, and the shift threshold is also correspondingly displaced. In a like manner the temperature of a fuel cell and/or of a range extender has an influence on the output of such a device and thus on the power maximum of the electric motor. Based on the correspondingly varying kink speed, the shift threshold is varied. Then, the power maximum of the electric motor is further in the available speed range. Thus, these influencing variables are taken into account in a particularly simple manner.

In order to determine the state of health and thus the ageing of the battery or the electric power source its internal resistance as well as, in the case of a battery, a number of loading and discharge cycles can be taken into account.

It has appeared further advantageous if a temperature of the transmission is considered as a variable influencing the speed by using the computed data value or the map. In the same manner, the temperature of the electric motor and/or the temperature of power electronics of the vehicle may be considered as a variable influencing that speed, at which the power provided by the electric motor has the maximum. These variables too can be simply detected and their consideration allows particularly realistic determination of the kink speed.

Other variables may include a derating of high voltage components or semiconductor elements of the vehicle. Such a derating may be employed for component part protection in order to avoid accelerated ageing and/or mechanical damage and in order to achieve a longer life span.

The influence of the mentioned variables may be considered in the map by theoretically determining the dependence of the kink speed on the same, thus for instance by modeling or the like and/or using a test stand. Then, an individual parameter, namely the kink speed, is available via the map, which considers the mentioned variables.

The method may be employed in a vehicle with automatic transmission with variable gear ratio. Correspondingly, then, the data value is supplied to a control device effecting the shift operation. Thereby, the acceleration of the vehicle, in particular the full-load acceleration, which utilizes the maximum power of the electric motor, is particularly comfortable.

The vehicle has at least one electric motor formed for propelling the vehicle. A transmission of the vehicle serves for performing a shift operation upon reaching a shift threshold. A control device of the vehicle is adapted to vary a value specifying the shift threshold depending on at least one parameter. Herein, the control device uses a speed as the at least one parameter, at which a power provided by the at least one electric motor for propelling the vehicle has a maximum. In such a vehicle, the power potential of the electric motor can be utilized upon maximum acceleration in particularly simple manner.

The advantages and embodiments described for the method also apply to the vehicle and vice versa.

The features and feature combinations mentioned above in the description as well as the features and feature combinations mentioned below in the description of figures and/or shown in the figures alone are usable not only in the respectively specified combination but also in other combinations or alone without departing from the scope of the invention. Thus, implementations not explicitly shown in the figures or explained, but which result and can be generated by separated feature combinations of the explained implementations are also to be considered encompassed and disclosed.

BRIEF DESCRIPTION OF THE DRAWINGS

These and other aspects, advantages, features and details will become more apparent and more readily appreciated from the following description of exemplary embodiments, taken in conjunction with the accompanying drawings of which.

DETAILED DESCRIPTION OF THE PREFERRED EMBODIMENT

Figure 1:
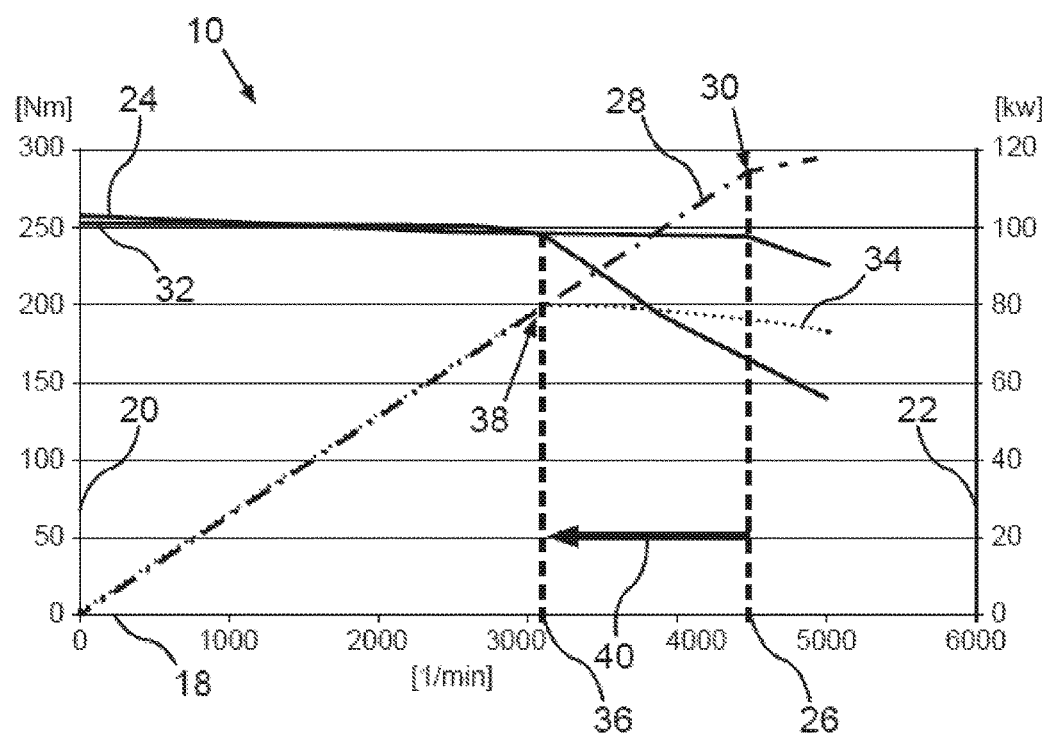
FIG. 1 is a graph, in which the progression of the torque and the power of an electric motor of a vehicle is shown related to the speed of the electric motor in different states of charge of a battery supplying the electric motor with electric energy.

Reference will now be made in detail to the preferred embodiments, examples of which are illustrated in the accompanying drawings, wherein like reference numerals refer to like elements throughout.

In a graph 10 shown in FIG. 1, the progression of the torque and the power progression of an electric motor 12 of a vehicle 14 (cf. FIG. 3) as a function of the speed in different states of charge of a battery 16 of the vehicle 14 are shown. On an abscissa 18 of the graph 10, the speed of the electric motor 12 in revolutions per minute [1/min] is indicated, on a first ordinate 20 its torque in Nm is indicated and on a second ordinate 22 its power in kW is indicated.

A first curve 24 illustrates the progression of the torque of the electric motor 12 with increasing speed if the battery 16 of the vehicle 14 has a high, in particular maximum state of charge. According to the first curve 24, the torque first remains constant and then drops upon reaching a certain speed 26. A further curve 28 illustrates the progression of the power delivered by the electric motor 12 if the battery 16 has the high state of charge. Correspondingly, the power reaches a maximum 30 at the speed 26. The speed 26, at which the torque output by the electric motor 12 decreases or the power reaches the maximum 30, is also referred to as kink speed, as the curve 24 abruptly bends down or kinks at this speed.

This kink speed is dependent on various influencing variables. The influence of the state of charge of the battery 16 is illustrated in the graph 10. Correspondingly, a third curve 32 in the graph 10 describes the progression of the torque and a fourth curve 34 in the graph 10 describes the progression of the power of the electric motor 12 if the battery 16 has a low, in particular minimum state of charge. Here, the torque already collapses at a lower speed 36 and also the power, which can be delivered by the electric motor 12, reaches its maximum 38 earlier, namely at this lower speed 36. The variation of the kink speed caused by the altered state of charge of the battery 16 is illustrated by an arrow 40 in FIG. 1.

Figure 3:
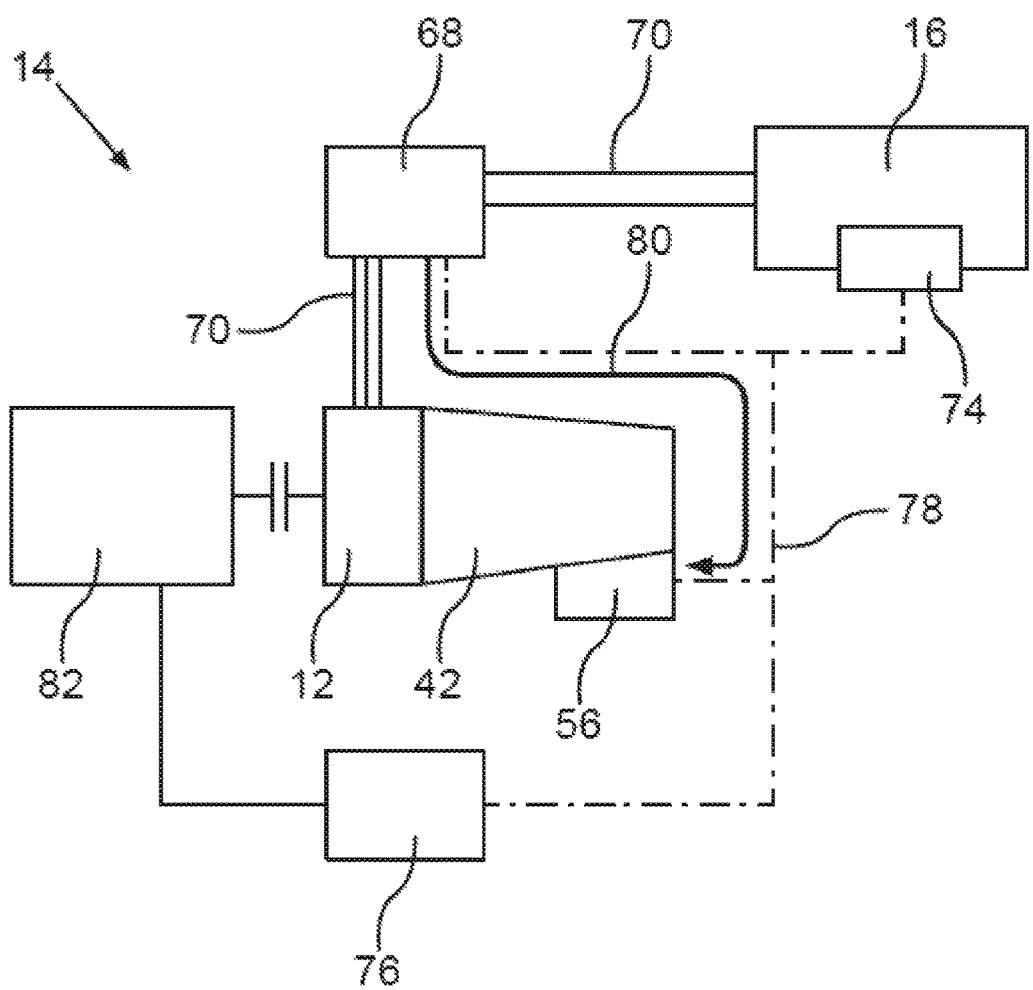
FIG. 3 is a block diagram of components of the vehicle and a communication path, via which a data value specifying the kink speed can be communicated to a transmission controller.

The realization that the kink speed varies depending on a plurality of influencing variables in the vehicle 14, is presently utilized to vary a shift threshold, thus a speed of the electric motor 12, at which an automatic shift operation is performed in a transmission 42 of the vehicle 14 (cf. FIG. 3). Thus, it can be ensured that upon full-load acceleration or maximum acceleration of the vehicle 14, the power maximally being able to be provided by the electric motor 12 is always exploited.

Figure 2:
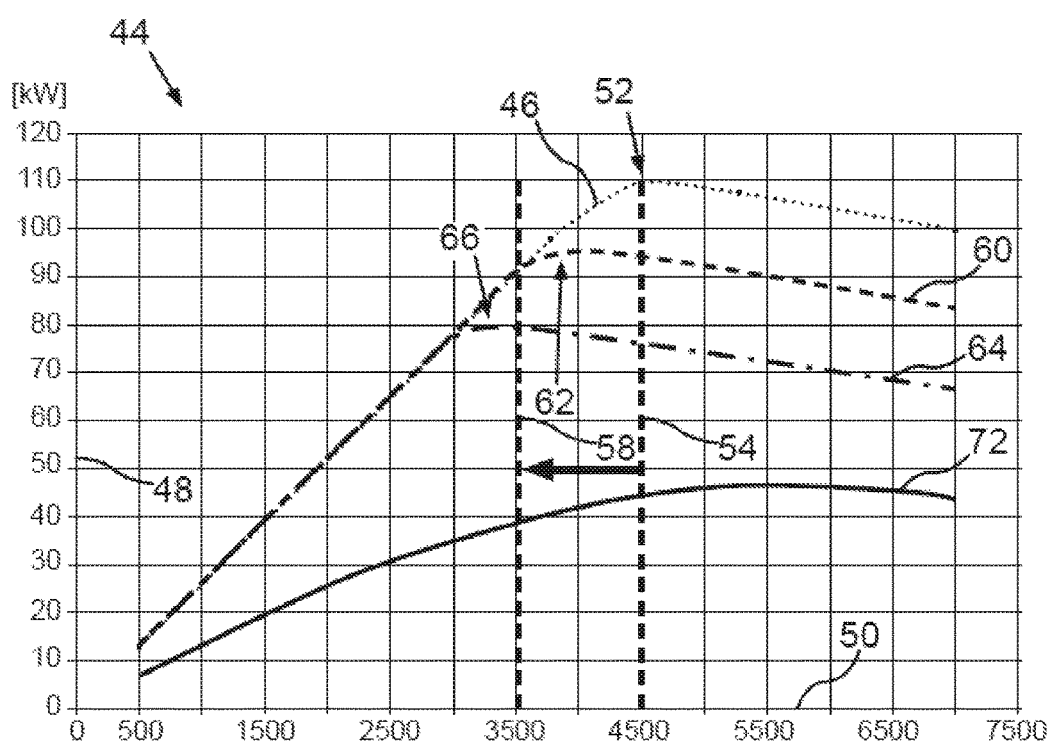
FIG. 2 a further graph, in which power curves of the electric motor depending on the battery voltage and a power curve for the continuous operation of the electric motor are shown.

In FIG. 2, in a further graph 44, the power progression of the electric motor 12 depending on the voltage of the battery 16 is illustrated. A first curve 46 in the graph 44 illustrates the power of the electric motor 12 plotted on an ordinate 48 in kW depending on the speed of the electric motor 12 plotted on an abscissa 50 in revolutions per minute.

The first curve 46 has a maximum 52. Upon reaching a shift speed 54 corresponding with this maximum 52, a shift operation is performed by a transmission controller 56 of the vehicle 14 (cf. FIG. 3) in the transmission 42. In the power train, a new subsequent speed 58 appears, which is lower than the shift speed 54.

A second curve 60 in FIG. 2 illustrates the power progression of the electric motor 12 of the vehicle 14 at a medium voltage of the battery 16. A maximum 62 of this second curve 60 is at a lower speed than the shift speed 54. Thus, if at this medium voltage of the battery 16 or such a source voltage the same shift speed 54 would be used, thus, the shift operation would not be effected upon reaching the maximum 62 of the power, but only at a higher speed. Thereby, a power potential of the electric motor 12 would remain unutilized in the electric or hybrid operation of the vehicle 14.

The graph 44 in FIG. 2 shows a third curve 64 indicating the power of the electric motor 12 at a still lower voltage of the battery 16. Correspondingly, a maximum 66 of this third curve 64 is at a still lower speed than at the medium voltage position of the battery 16 according to the curve 60.

Furthermore, it is apparent from FIG. 2 that the maximum 62 of the second curve 60 is lower than the maximum 52 of the first curve 46 and the maximum 66 of the third curve 64 is lower than the maximum 62 of the second curve 60.

In order to optimally exploit the available mechanical propulsion power in the electric drive operation—or in the electrically assisted hybrid drive operation—with regard to the maximum acceleration, presently, the shift speed 54 or the shift threshold is therefore varied. Namely, if the source voltage, presently thus the voltage of the battery 16, decreases due to discharge thereof, thus, the power maximum of the electric motor 12 shifts towards lower speeds. Correspondingly, then, the shift speed 54 is decreased such that the power maximum of the electric motor 12 is further in the available speed range.

If the electric motor 12 is heavily loaded, thus for instance operated under full load, thus, overheating of the magnets and windings used in it occurs. Furthermore, power electronics 68 associated with the electric motor 12, the battery 16 as well as lines 70 may overheat, which connect the battery 16 to the power electronics 68 and the power electronics 68 to the electric motor 12 (cf. FIG. 3). In order to protect the mentioned component parts in such a case, the power delivered by the electric motor 12 is reduced by supplying less current to it. A corresponding continuous operating mode 72 of the electric motor 12 is illustrated in the graph 44 in FIG. 2 by a fourth curve.

In this continuous operating mode 72, the electric motor 12 can continuously provide power without overheating of the electric motor 12 or of the further components possibly affected by overheating having to be feared. As is apparent from the graph 44, the power maximum of the electric motor 12 shifts towards higher speeds related to the shift speed 54 if it is operated in the continuous operating mode 72. Correspondingly, in this operating state, the shift speed 54 is shifted to higher values such that the power maximum of the electric motor 12 is further in the available speed range.

Based on FIG. 3, it can be illustrated how the communication in the vehicle 14 can proceed in order to effect the corresponding variation of the shift speed 54. Control devices of the vehicle 14 such as for instance the transmission controller 56, a battery management system 74 and a motor controller 76 are connected to each other via a suitable communication path, for instance a CAN bus system 78.

Presently, the currently prevailing speed 26, 36 (cf. FIG. 1) is determined by the power electronics 68, at which the power maximum is available for the electric drive propulsion. A signal 80 specifying this respective kink speed is communicated to the transmission controller 56 via the CAN bus system 78. The transmission controller 56 utilizes this information for adapting the shift speed 54 to the respectively present maximum power curve.

By determining the kink speed of the electric motor 12 depending on influencing variables as the load voltage, the state of charge and the temperature of the battery 16, the temperature of the electric motor 12, the temperature of the transmission 42 and/or the temperature of the power electronics 68 in a first step, only this individual parameter, namely the kink speed, has to be used in a second step. In the second step, then, the shift characteristics are displaced depending on the kink speed by the transmission controller 56. This consideration of the kink speed for controlling the shift characteristics is particularly low in effort since the kink speed determined by the power electronics 68 already considers the described influencing variables.

In alternative embodiments, the kink speed can also be determined by a different control device than the power electronics 68, for instance by the battery management system 74 or by the motor controller 76.

Since the vehicle 14 is presently formed as a hybrid vehicle, the motor controller 76 presently controls an internal combustion engine 82 of the vehicle 14. However, the displacement of the shift threshold or shift speed 54 depending on the kink speed, thus the speed 26, 36, can also be employed in a vehicle 14 formed as an electric vehicle.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

What is claimed is:

1. A method for operating a vehicle with all electric or hybrid power and having a shiftable transmission, in which at least one electric motor is employed for propelling the vehicle, comprising:
    performing a shift operation in the shiftable transmission of the vehicle upon reaching a shift threshold specified by a value varied depending on at least one parameter, the at least one parameter including a speed at which a power, provided by the at least one electric motor for propelling the vehicle, reaches a maximum prior to dropping below the maximum.

2. The method according to claim 1, wherein the shift operation is performed when an acceleration of the vehicle under full load of the at least one electric motor is requested by a driver of the vehicle or by a control system of the vehicle.

3. The method according to claim 1, wherein the value specifying the shift threshold is changed when the at least one electric motor is operated in a continuous operating mode in which operational damage to the at least one electric motor and/or at least one component associated with the at least one electric motor is avoided.

4. The method according to claim 1, further comprising obtaining a data value specifying the speed by at least one of computation and from a map.

5. The method according to claim 4, wherein by using the data value, at least one variable is taken into account, which is associated with at least one of an electric energy storage and an electric power source of the vehicle and which influences the speed, at which the power provided by the at least one electric motor for propelling the vehicle has the maximum.

6. The method according to claim 5, wherein the at least one variable which is taken into account includes at least one of a voltage, a voltage under load, a state of charge, a state of health and a temperature.

7. The method according to claim 4, wherein by using the data value, at least one of a temperature of the transmission, a temperature of the at least one electric motor, a temperature of power electronics, and a derating of high voltage components or semiconductor elements of the vehicle is considered as a variable, which influences the speed, at which the power provided by the at least one electric motor for propelling the vehicle has the maximum.

8. The method according to claim 3, further comprising supplying the data value to a control device, which effects the shift operation.

9. A vehicle, comprising:
    at least one electric motor configured to propel the vehicle;
    a shiftable transmission configured to perform a shift operation upon reaching a shift threshold; and
    a control device configured to vary a value specifying the shift threshold depending on at least one parameter, including a speed, as the at least one parameter, at which a power, provided by the at least one electric motor, reaches a maximum prior to dropping below the maximum.

* * * * *

UNITED STATES PATENT AND TRADEMARK OFFICE
CERTIFICATE OF CORRECTION

PATENT NO.        : 10,059,329 B2
APPLICATION NO.   : 15/104263
DATED             : August 28, 2018
INVENTOR(S)       : Andreas Petz et al.

Page 1 of 1

It is certified that error appears in the above-identified patent and that said Letters Patent is hereby corrected as shown below:

In the Claims

Column 8, Line 34:
In Claim 8, delete "3," and insert -- 4, --, therefore.

Signed and Sealed this
Twenty-third Day of October, 2018

Andrei Iancu
*Director of the United States Patent and Trademark Office*